United States Patent
Iwata et al.

(10) Patent No.: US 10,618,732 B2
(45) Date of Patent: Apr. 14, 2020

(54) ARTICLE TRANSFER DEVICE

(71) Applicant: Daifuku Co., Ltd., Osaka-shi (JP)

(72) Inventors: Masashige Iwata, Hinocho (JP); Hirotaka Osako, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/987,081

(22) Filed: May 23, 2018

(65) Prior Publication Data
US 2018/0339858 A1 Nov. 29, 2018

(30) Foreign Application Priority Data
May 25, 2017 (JP) .................. 2017-103810

(51) Int. Cl.
*B65G 1/137* (2006.01)
*B65G 1/04* (2006.01)
*B65G 41/00* (2006.01)
*B65G 15/30* (2006.01)

(52) U.S. Cl.
CPC ........... *B65G 1/137* (2013.01); *B65G 1/0435* (2013.01); *B65G 41/003* (2013.01); *B65G 15/30* (2013.01)

(58) Field of Classification Search
CPC .... B65G 1/137; B65G 1/0435; B65G 41/003; B65G 15/30
USPC ........................................ 414/277, 278, 280
See application file for complete search history.

(56) References Cited

U.S. PATENT DOCUMENTS

| | | | | |
|---|---|---|---|---|
| 4,756,657 A * | 7/1988 | Kinney | ................ | B65G 1/0435 414/280 |
| 4,812,102 A * | 3/1989 | Smith | .................. | B65G 1/0435 414/280 |
| 4,856,956 A * | 8/1989 | Zur | ...................... | B65G 1/0435 414/280 |
| 5,558,483 A * | 9/1996 | Masuda | ............... | B65G 1/0407 414/278 |
| 6,234,550 B1 * | 5/2001 | Stoltenhoff | .......... | B65G 1/0435 294/119.1 |
| 6,923,612 B2 * | 8/2005 | Hansl | .................... | B65G 1/0435 414/277 |
| 7,128,521 B2 * | 10/2006 | Hansl | .................... | B65G 1/0435 414/807 |
| 8,740,542 B2 * | 6/2014 | Wolkerstorfer | ...... | B65G 1/0435 414/280 |
| 9,242,794 B2 * | 1/2016 | van Ooyen | ............. | B65G 1/04 |
| 9,403,666 B2 * | 8/2016 | Olszak | ...................... | B66F 9/07 |
| 9,718,617 B2 * | 8/2017 | Koide | .................. | B65G 1/0492 |
| 9,994,394 B2 * | 6/2018 | Masuda | ............... | B65G 1/0421 |
| 10,322,876 B2 * | 6/2019 | Preidt | .................. | B65G 1/1371 |

(Continued)

FOREIGN PATENT DOCUMENTS

JP 2009286615 A 12/2009
JP 2010163215 A 7/2010

*Primary Examiner* — Kaitlin S Joerger
(74) *Attorney, Agent, or Firm* — The Webb Law Firm

(57) ABSTRACT

An article transfer device includes: a guide movement mechanism for moving a first guide portion and a second guide portion independently along a first direction; and an interlocking mechanism for interlocking movement of the first guide portion and the second guide portion along the first direction with movement of an article supporting portion such that the article supporting portion is located midway between the first guide portion and the second guide portion in the first direction.

4 Claims, 10 Drawing Sheets

(56) References Cited

U.S. PATENT DOCUMENTS

| | | | | |
|---|---|---|---|---|
| 2003/0091411 A1* | 5/2003 | Diehm | ............... | B65G 1/0435 |
| | | | | 414/280 |
| 2004/0228710 A1* | 11/2004 | Ueda | ............... | B65G 1/0421 |
| | | | | 414/279 |
| 2006/0245862 A1* | 11/2006 | Hansl | ............... | B65G 1/0435 |
| | | | | 414/281 |
| 2015/0023772 A1* | 1/2015 | Beer | ............... | B65G 17/323 |
| | | | | 414/751.1 |
| 2015/0321845 A1* | 11/2015 | Nakamura | ............... | B65G 1/0421 |
| | | | | 414/273 |
| 2018/0134488 A1* | 5/2018 | Grosse | ............... | B65G 1/0435 |
| 2018/0339858 A1* | 11/2018 | Iwata | ............... | B65G 1/0435 |

\* cited by examiner

ARTICLE TRANSFER DEVICE

CROSS-REFERENCE TO RELATED APPLICATION

This application claims priority to Japanese Patent Application No. 2017-103810 filed May 25, 2017, the disclosure of which is hereby incorporated in its entirety by reference.

BACKGROUND OF THE INVENTION

1. Field of the Invention

The present invention relates to an article transfer device.

2. Description of the Related Art

An article transfer device has been used including an article supporting portion that supports an article from below, a first guide portion and a second guide portion that oppose each other in a first direction extending along a horizontal plane, across the article supported by the article supporting portion, a base that supports the article supporting portion, the first guide portion, and the second guide portion, and an article movement mechanism for moving the article relative to the base in a second direction orthogonal to the first direction on the horizontal plane. An example of the article transfer device having such a configuration is disclosed in JP 2009-286615A (Patent Document 1). In the following, the reference numerals shown in parentheses in the description of the related art are those of Patent Document 1.

As shown in FIGS. 1, 2 and so forth of Patent Document 1, the article transfer device of Patent Document 1 includes a fixed supporting portion (23) that supports a load (W) from below, a pair of transfer units (17) that oppose each other in the left-right direction (transverse direction), across the load (W) supported by the fixed supporting portion (23), a body (7) that supports the fixed supporting portion (23) and the pair of transfer units (17), and a longitudinal feeding mechanism (25) and a load feeding means (21) for moving the load (W) relative to the body (7) along the front-rear direction (longitudinal direction). Also, in the article transfer device of Patent Document 1, the fixed supporting portion (23) is disposed at the center position between the pair of transfer units (17) in the left-right direction, thereby enabling stable support of the load (W) (see paragraphs 0013, 0026, and 0038).

In the article transfer device of Patent Document 1, the pair of transfer units (23) are configured to synchronously move in directions opposite to each other in the left-right direction (see paragraph 0031). Accordingly, the center position between the pair of transfer units (23) in the left-right direction is constant, and the fixed supporting portion (23) is fixed to the body (7) so as to be disposed at the center position. Thus, in the article transfer device of Patent Document 1, the article supporting portion is fixed to the base, and the first guide portion and the second guide portion are configured to synchronously move in directions opposite to each other in the first direction.

SUMMARY OF THE INVENTION

Meanwhile, with a configuration such as that of the article transfer device of Patent Document 1, in which the first guide portion and the second guide portion synchronously move in directions opposite to each other in the first direction, it is not possible to move the center position between the first guide portion and the second guide portion in the first direction. Therefore, when it is necessary to adjust the center position in order to perform alignment with an article to be transferred or a transfer target location (a rack or the like), a mechanism for moving the base that supports the first guide portion and the second guide portion or the entire article transfer device in the first direction needs to be provided. To avoid this problem, it is conceivable to configure the first guide portion and the second guide portion so as be independently movable in the first direction. However, in this case, as the center position between the first guide portion and the second guide portion in the first direction moves relative to the base, the amount of displacement between the article supporting portion fixed to the base and the center position in the first direction increases, which may result in reduced stability for supporting articles. However, Patent Document 1 does not discuss these issues.

Therefore, there is a need to achieve an article transfer device including the first guide portion and the second guide portion that are configured to be independently movable along the first direction, and can stably support an article using the article supporting portion.

An article transfer device according to the present disclosure includes: an article supporting portion that supports an article from below; a first guide portion and a second guide portion that oppose each other in a first direction extending along a horizontal plane across, the article supported by the article supporting portion; a base that supports the article supporting portion, the first guide portion, and the second guide portion; and an article movement mechanism for moving the article relative to the base along a second direction orthogonal to the first direction on the horizontal plane. The article supporting portion, the first guide portion, and the second guide portion are supported by the base so as to be movable in the first direction, and the article transfer device further includes: a guide movement mechanism for moving the first guide portion and the second guide portion independently along the first direction; and an interlocking mechanism for interlocking movement of the first guide portion and the second guide portion along the first direction with movement of the article supporting portion such that the article supporting portion is located midway between the first guide portion and the second guide portion in the first direction.

With the above-described configuration, the article transfer device includes the guide movement mechanism for moving the first guide portion and the second guide portion independently along the first direction. Accordingly, the movement direction and the movement distance in the first direction can be set independently for each of the first guide portion and the second guide portion. Thus, by moving one or both of the first guide portion and the second guide portion along the first direction, it is possible to adjust not only the distance (the separation distance in the first direction) between the first guide portion and the second guide portion, but also the center position between the first guide portion and the second guide portion in the first direction.

Furthermore, with the above-described configuration, the article supporting portion that supports the article from below is supported by the base so as to be movable in the first direction, and the article transfer device includes the interlocking mechanism, in addition to the guide movement mechanism. Then, the interlocking mechanism is configured to interlock the movement of the first guide portion and the second guide portion along the first direction with the movement of the article supporting portion such that the article supporting portion is located midway between the first guide portion and the second guide portion in the first direction. Thus, even when the center position between the first guide portion and the second guide portion in the first direction is moved relative to the base, it is possible to move the article supporting portion in the first direction so as to follow the movement of the center position, thus supporting the central part of the article in the first direction with the article supporting portion.

As described above, with the above-described configuration, it is possible to achieve an article transfer device that can stably support the article with the article supporting portion, while achieving a configuration in which the first guide portion and the second guide portion are independently movable along the first direction.

Further features and advantages of the article transfer device will become apparent from the following description of embodiments with reference to the drawings.

DETAILED DESCRIPTION OF PREFERRED EMBODIMENTS

An embodiment of the article transfer device will be described with reference to the drawings. Here, a description is given of an exemplary case where an article transfer device according to the present disclosure is applied to a stacker crane in an article transport facility.

Figure 1:
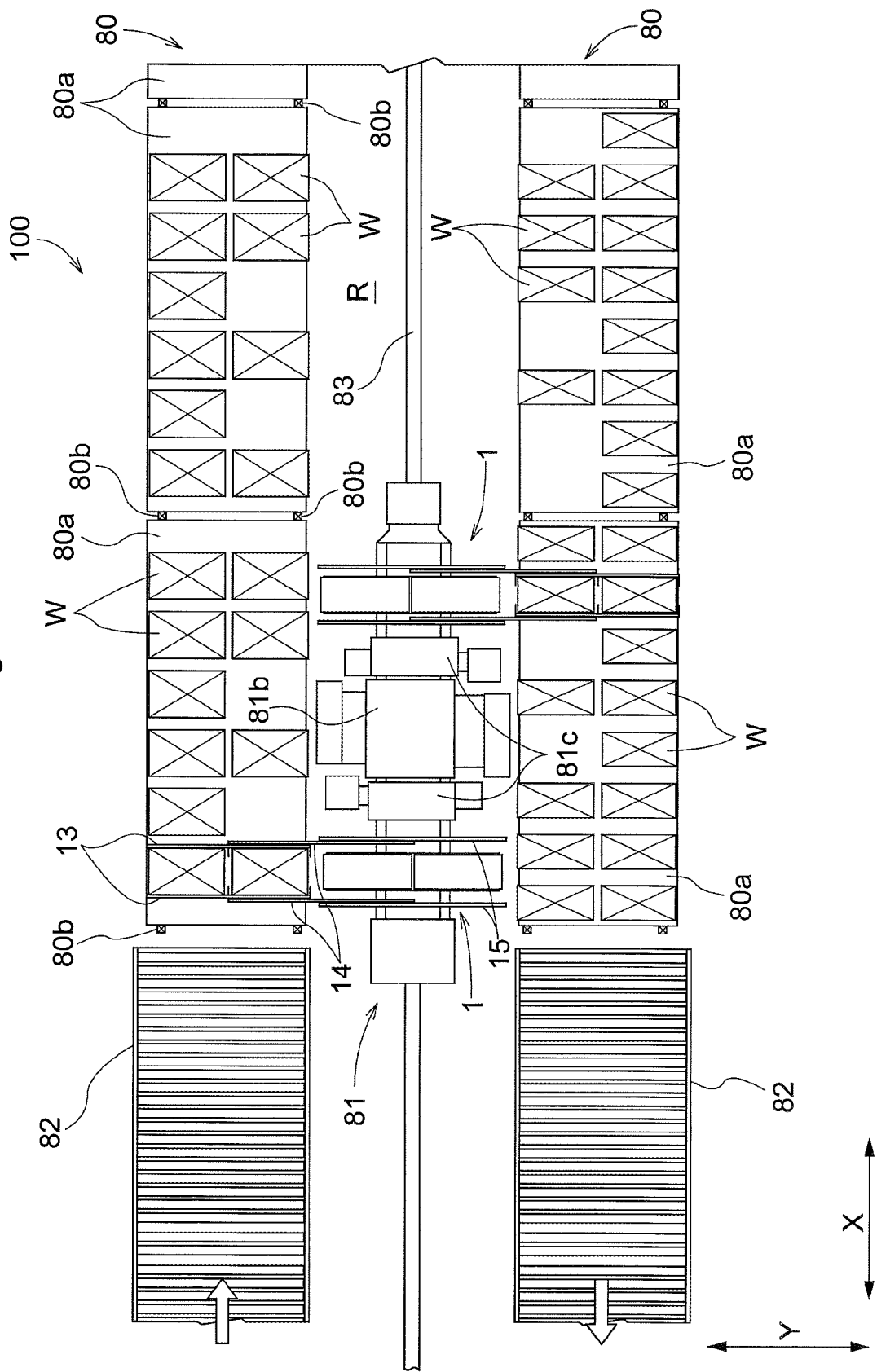
FIG. 1 is a plan view of an article transport facility.

As shown in FIG. 1, an article transport facility 100 includes a storage rack 80 that stores an article W, and a stacker crane 81 that transports the article W. The article W may be a cardboard box case, a container case, or the like, for example. The storage rack 80 is configured such that a plurality of articles W can be stored so as to be arranged in a rack lateral width direction X, and the stacker crane 81 travels along a traveling path R formed adjacent to the storage rack 80 in a rack front-rear direction Y (i.e., a traveling path R formed in front of the storage rack 80) along the rack lateral width direction X so as to transport an article W. Here, the rack lateral width direction X is a direction along a horizontal plane, and the rack front-rear direction Y is a direction orthogonal to the rack lateral width direction X on the horizontal plane. A pair of storage racks 80 are installed so as to oppose each other in the rack front-rear direction Y, across the traveling path R, and a below described article transfer device 1 included in the stacker crane 81 is configured to transfer the article W to both of the pair of storage racks 80.

The operation of transporting an article W performed by the stacker crane 81 includes a storage transport operation of transporting the article W to the storage rack 80, and a retrieval transport operation of transporting the article W from the storage rack 80. As shown in FIG. 1, a transport conveyor 82 is provided at a position adjacent to each storage rack 80 in the rack lateral width direction X. In the storage transport operation, the article W is transported from a storage transport conveyor 82 to a storage location set in a storage rack 80. In the retrieval transport operation, the article W is transported from a storage location of the article W in the storage rack 80 to a retrieval transport conveyor 82.

Figure 2:
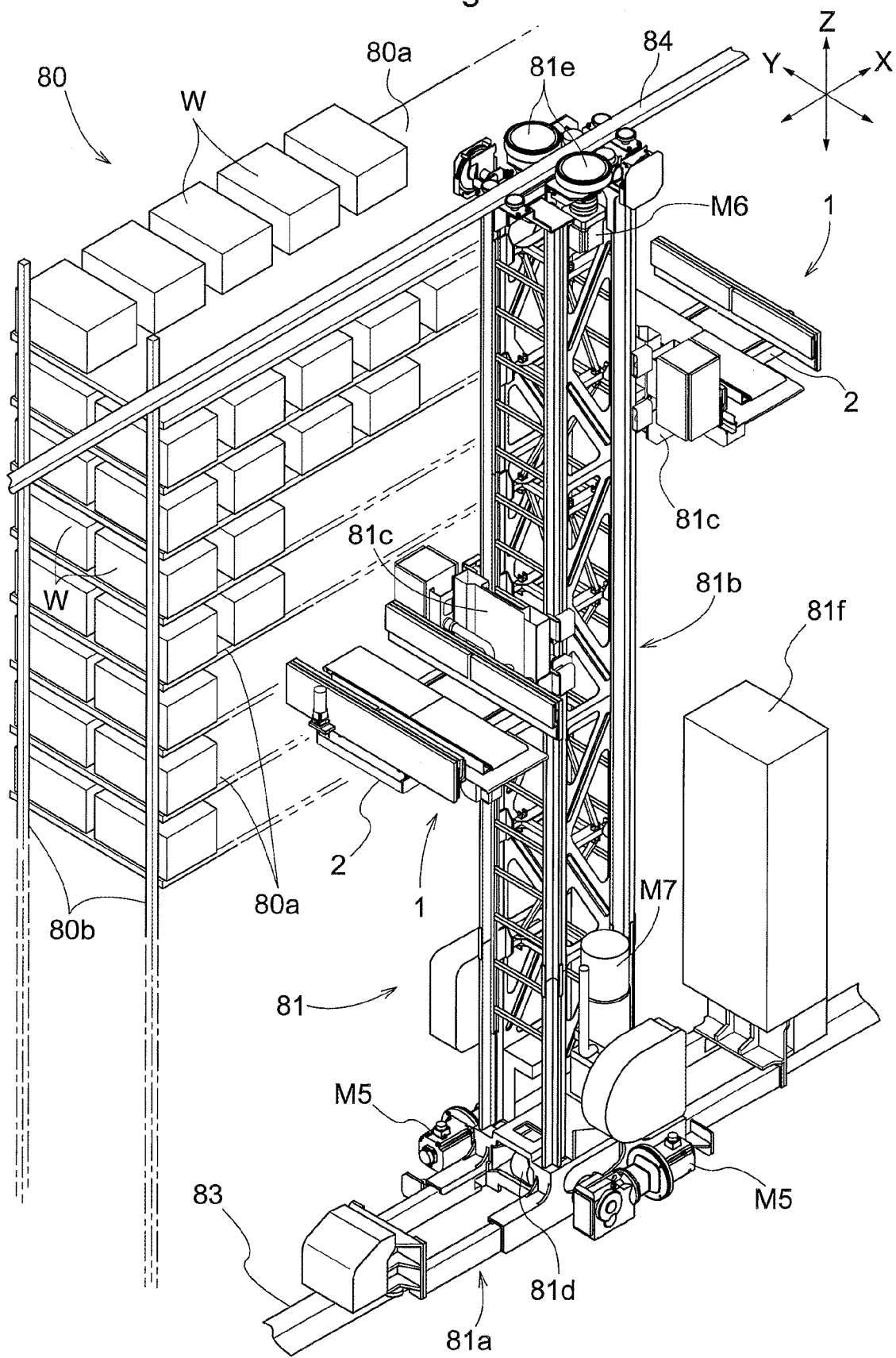
FIG. 2 is a perspective view of a stacker crane.

As shown in FIGS. 1 and 2, each storage rack 80 includes a plurality of struts 80b provided standing upright on the floor so as to be arranged in the rack lateral width direction X, and a support member 80a that is attached to the struts 80b and supports an article W from below. The support member 80a is formed to be plate-like, and is provided so as to span a pair of struts 80b arranged in the rack lateral width direction X. The support member 80a is configured to support a plurality of articles W arranged in the rack lateral width direction X, and is also configured to support a plurality of articles W (specifically, two articles W) arranged in the rack front-rear direction Y. A plurality of support members 80a are attached to the struts 80b at intervals in a vertical direction Z, and the storage rack 80 is configured to store articles W at a plurality of positions in the vertical direction Z (i.e., on each of a plurality of rows arranged in the vertical direction Z).

The storage rack 80 is configured to store a plurality of types of articles W having mutually different widths in the rack lateral width direction X. That is, the article transfer device 1 is intended to transfer a plurality of types of articles W having mutually different widths in the rack lateral width direction X. Although FIGS. 1 and 2 illustrate a case where a plurality of articles W having the same or similar widths in the rack lateral width direction X are supported by one support member 80a, the storage locations of the articles W in the storage rack 80 may be set such that a plurality of articles W having different widths in the rack lateral width direction X are supported by one support member 80a.

As shown in FIG. 2, the stacker crane 81 includes a traveling truck 81a capable of traveling along the traveling path R (see FIG. 1), a mast 81b provided upright on the traveling truck 81a, an elevating body 81c that is movable (i.e., capable of being lifted and lowered) along the mast 81b in the vertical direction Z, and an article transfer device 1 that is supported by the elevating body 81c and transfers an article W between itself and a transfer target location (e.g., the storage rack 80 or the transport conveyor 82) of the article W. The traveling truck 81a includes a lower driving wheel 81d that comes into contact with a lower guide rail 83 provided on the floor along the traveling path R, and the stacker crane 81 is provided with a first traveling motor M5 that rotationally drives the lower driving wheel 81d. The traveling truck 81a includes a pair of lower driving wheels 81d arranged in the traveling direction (the rack lateral width direction X), and a pair of first traveling motors M5 are provided corresponding to the pair of lower driving wheels 81d. A control device 81f that controls the operations of the stacker crane 81 controls the driving of the first traveling motors M5 so as to rotationally drive the lower driving wheels 81d, thereby causing the traveling truck 81a to travel along the rack lateral width direction X.

The stacker crane 81 further includes an upper driving wheel 81e that comes into contact with an upper guide rail 84 provided along the traveling path R above the lower guide rail 83 in the vertical direction Z (the upper side than the lifting/lowering range of the elevating body 81c), and a second traveling motor M6 that rotationally drives the upper driving wheel 81e. The upper driving wheel 81e is provided in the upper portion the mast 81*b*. A pair of upper driving wheels 81*e* are provided so as to sandwich the upper guide rail 84 from both sides in the rack front-rear direction Y, and a pair of second traveling motors M6 are provided corresponding to the pair of upper driving wheels 81*e*. In accordance with the rotational driving of the lower driving wheels 81*d*, the control device 81*f* controls the driving of the second traveling motors M6 so as to rotationally drive the upper driving wheels 81*e*, thereby causing the stacker crane 81 to travel along the rack lateral width direction X.

The elevating body 81*c* is configured to be guided by the mast 81*b* so as to be lifted and lowered at a position adjacent to the mast 81*b* in the rack lateral width direction X. Although the details are omitted, the mast 81*b* is formed by connecting together four struts provided standing upright on the traveling truck 81*a*. The stacker crane 81 is provided with a drum around which a cable-like body, such as a wire, whose one end is connected to the elevating body 81*c*, and an elevating motor M7 that rotationally drives the drum in a forward direction and a backward direction. The control device 81*f* controls the driving of the elevating motor M7 so as to wind or unwind the cable-like body, thereby moving the elevating body 81*c* up and down. A pair of elevating bodies 81*c* are provided so as to be arranged in the rack lateral width direction X, across the mast 81*b* in plan view (as viewed in the vertical direction). That is, the elevating bodies 81*c* are respectively provided on both sides of the mast 81*b* in the rack lateral width direction X. Also, a pair of elevating motors M7 are provided corresponding to the pair of elevating bodies 81*c*, and the control device 81*f* can move the pair of elevating bodies 81*c* up and down independently of each other. Accordingly, simultaneous transfer of articles W by an article transfer device 1 supported by one of the pair of elevating bodies 81*c* and an article transfer device 1 supported by the other (i.e., a pair of article transfer devices 1 disposed spaced apart in the rack lateral width direction X) can be performed not only in a state in which the pair of elevating bodies 81*c* are lifted or lowered to the same height, but also in a state in which the pair of elevating bodies 81*c* are lifted or lowered to mutually different heights.

Figure 9:
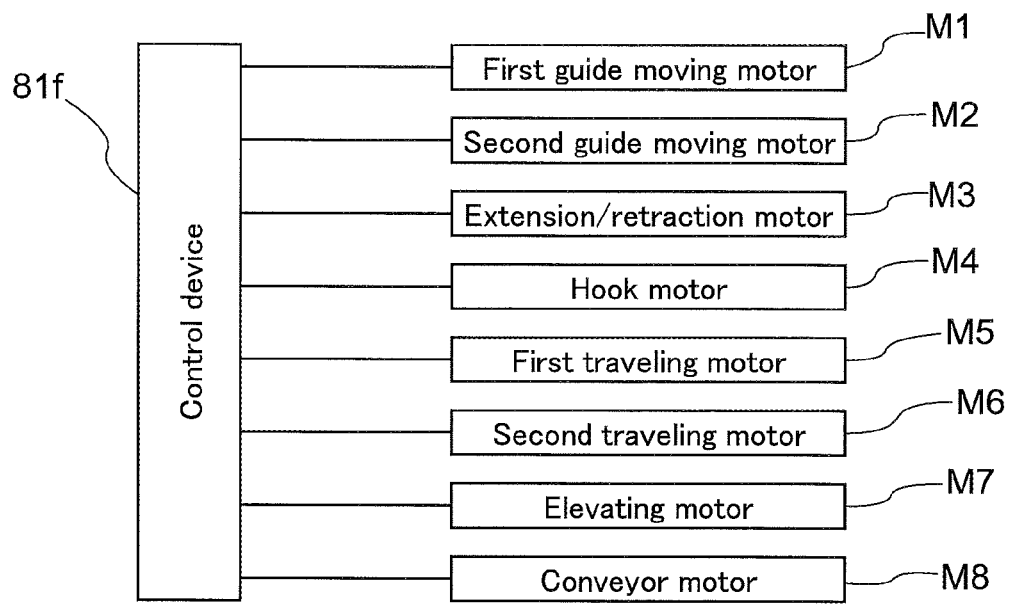
FIG. 9 is a control block diagram.

The control device 81*f* controls the operations of the stacker crane 81 by controlling the driving of various motors (see FIG. 9) based on detection information from various sensors (e.g., a rotary encoder and a laser range finder). Although the details are omitted, the control device 81*f* includes a processor such as a microcomputer, and also includes peripheral circuits such as a memory. These pieces of hardware and a program executed on a piece of hardware such as the processor work cooperatively so as to implement various functions of the control device 81*f*. Note that, although FIG. 2 shows an exemplary configuration in which the control device 81*f* is provided in the stacker crane 81, at least some of the functions of the control device 81*f* may be provided independently of the stacker crane 81 (i.e., in another derive capable of communicating with the stacker crane 81).

Next, the configuration of the article transfer device 1 will be described. As described previously, the stacker crane 81 includes a pair of article transfer devices 1 disposed so as to be spaced apart in the rack lateral width direction X. One of the article transfer devices 1 has a configuration in which the other article transfer device 1 is translated in the rack lateral width direction X, a configuration in which the other article transfer device 1 is inverted in the rack lateral width direction X (a configuration having a mirror-symmetrical relationship with the other article transfer device 1 with respect to a plane orthogonal to the rack lateral width direction X as a plane of symmetry), or a configuration in which the other article transfer device 1 is rotated 180 degrees about a shaft that is parallel to the vertical direction Z. Therefore, these pairs of article transfer devices 1 will be described without being differentiated from each other, but each of a pair of article transfer devices 1 includes the following common components.

Figure 3:
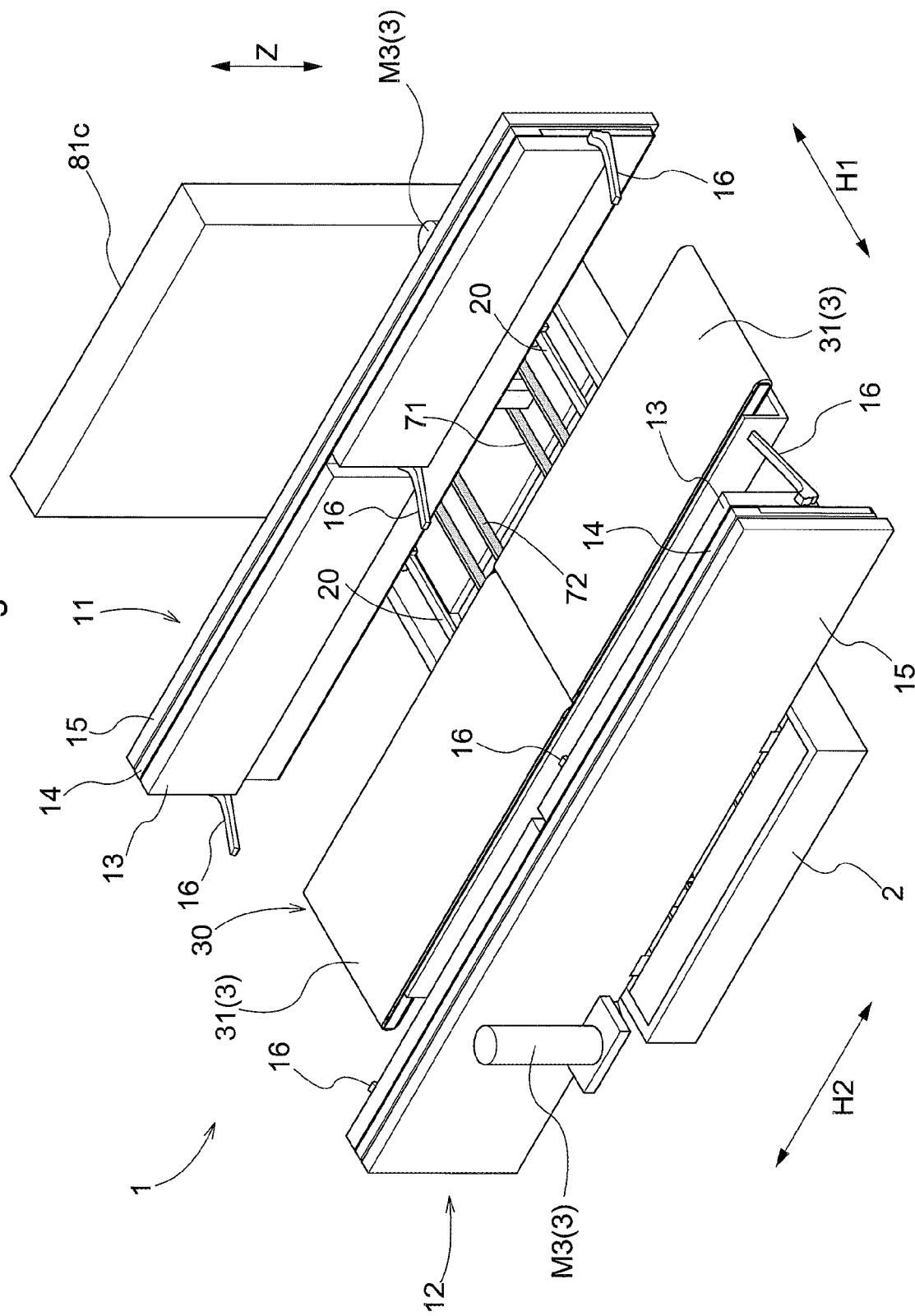
FIG. 3 is a perspective view of an article transfer device.
Figure 6:
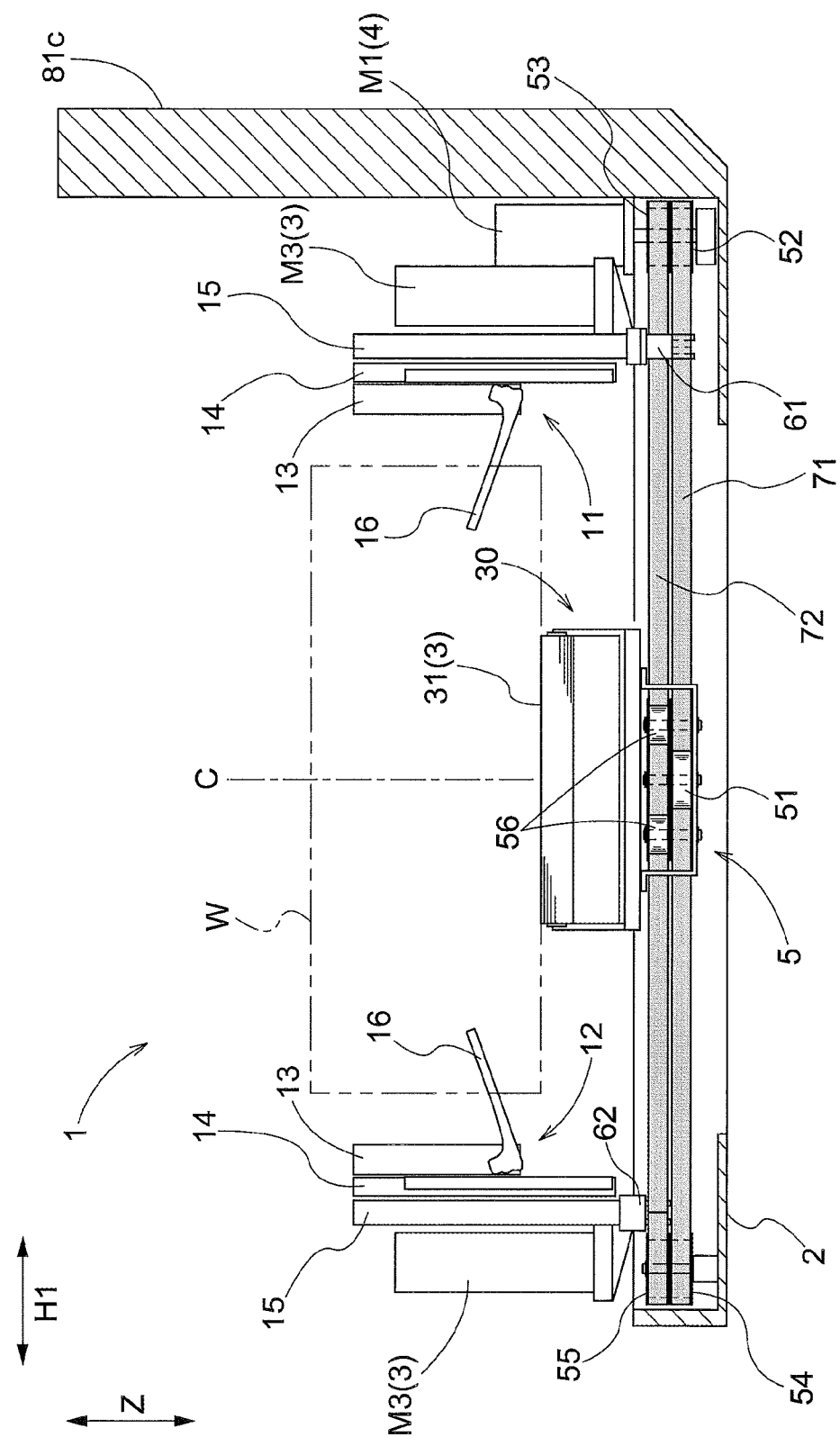
FIG. 6 is a front view of the article transfer device.

As shown in FIGS. 3 and 6, the article transfer device 1 includes an article supporting portion 30 that supports an article W from below, a first guide portion 11 and a second guide portion 12 that oppose each other in a first direction H1 extending along a horizontal plane, across the article W supported by the article supporting portion 30, and a base 2 that supports the article supporting portion 30, the first guide portion 11, and the second guide portion 12. The article transfer device 1 moves up and down integrally with an elevating body 81*c* while being supported by the elevating body 81*c*. Specifically, the elevating body 81*c* includes an upright portion that is guided to be lifted and lowered by a guide rail formed on the mast 81*b*, and a support frame extending from the upright portion to a side away from the mast 81*b* in the rack lateral width direction X, and the article transfer device 1 is mounted to the elevating body 81*c*, with the support frame serving as the base 2. The article transfer device 1 includes an article movement mechanism 3 for moving the article W relative to the base 2 along a second direction H2 orthogonal to the first direction H1 on the horizontal plane. The article transfer device 1 is configured to transfer an article W between a transfer target location of the article W and itself by moving the article W along the second direction H2 by using the article movement mechanism 3. Accordingly, the article transfer device 1 is mounted to the elevating body 81*c* in an orientation in which the second direction H2 extends along the rack front-rear direction Y (in other words, in an orientation in which the first direction H1 extends along the rack lateral width direction X). The article transfer device 1 is intended to transfer a plurality of types of articles W having different widths in the first direction H1. By mounting the article transfer device 1 to the elevating body 81*c* in such an orientation, a plurality of types of articles W having mutually different widths in the rack lateral width direction X can be stored in the storage rack 80 as shown in FIG. 1.

Each of the first guide portion 11 and the second guide portion 12 includes a guide part extending in the second direction H2 along a side face of the article W supported by the article supporting portion 30 (a part that functions as a guide to restrict the position of the article W in the first direction H1). The guide part is disposed so as to come into contact with a side face of the article W supported by the article supporting portion 30, or to oppose the side face with an interval therebetween in the first direction H1. As will be described later, in the present embodiment, each of the first guide portion 11 and the second guide portion 12 includes a distal-end member 13, and an inner face (face facing the inner side (the side on which the article supporting portion 30 is located) in the first direction H1) of the distal-end member 13 constitutes the guide part (guide face).

Figure 5:
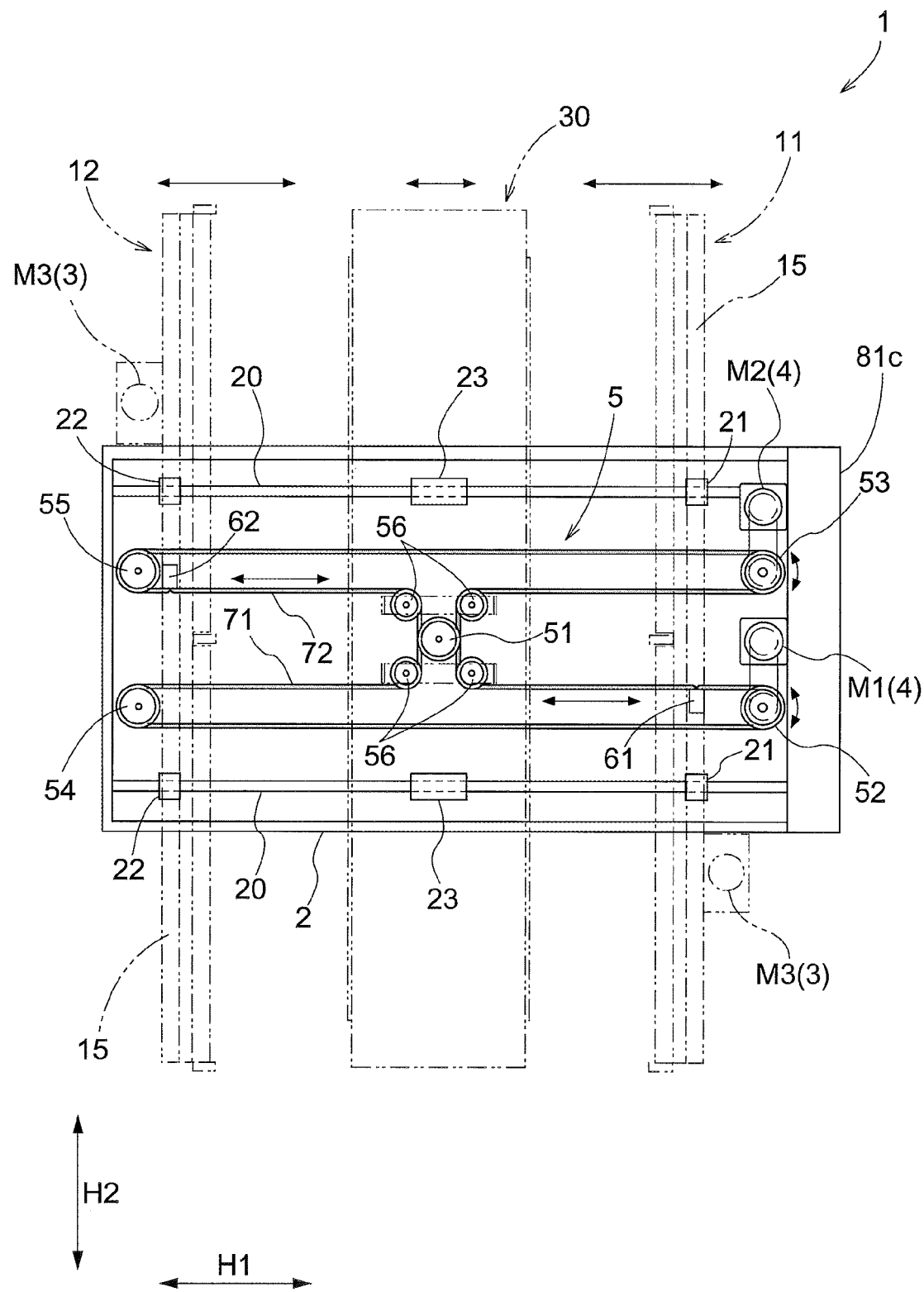
FIG. 5 is a partially phantom plan view of the article transfer device.

The article supporting portion 30, the first guide portion 11, and the second guide portion 12 are supported by the base 2 so as to be movable in the first direction H1. Specifically, as shown in FIG. 5, the base 2 is provided with a guide rail 20 (an example of the guide portion) that extends along the first direction H1, and a guide block (an example of a guided portion) that can move in the first direction H1 while being guided by the guide rail 20 is connected to each of the article supporting portion 30, the first guide portion 11, and the second guide portion 12. Specifically, a first guide block 21 is connected to a lower portion of the first guide portion 11 (specifically, below a basal member 15 described below) so as to move integrally with the first guide portion 11 along the first direction H1, a second guide block 22 is connected to a lower portion of the second guide portion 12 (specifically, below a basal member 15 described below) so as to move integrally with the second guide portion 12 along the first direction H1, and a third guide block 23 is connected to a lower portion of the article supporting portion 30 so as to move integrally with the article supporting portion 30 along the first direction H1. Each of the basal member 15 of the first guide portion 11, the basal member 15 of the second guide portion 12, and the article supporting portion 30 moves along the guide rail 20 in the first direction H1 in a state in which movement in the second direction H2 relative to the base 2 is restricted by the guide rail 20. As shown in FIG. 5, a pair of guide rails 20 are provided with a distance therebetween in the second direction H2, and a pair of guide blocks are connected with a distance therebetween in the second direction H2 below each of the first guide portion 11, the second guide portion 12, and the article supporting portion 30.

The article transfer device 1 includes a guide movement mechanism 4 for moving the first guide portion 11 and the second guide portion 12 independently along the first direction H1. The guide movement mechanism 4 is configured to allow the first guide portion 11 and the second guide portion 12 to be respectively moved to both sides in the first direction H1. The control device 81f operates the guide movement mechanism 4 so as to move one or both of the first guide portion 11 and the second guide portion 12 along the first direction H1, thereby adjusting the distance (the separation distance in the first direction H1) between the first guide portion 11 and the second guide portion 12, or adjusting a center position C (see FIGS. 6 to 8) between the first guide portion 11 and the second guide portion 12 in the first direction H1. Since the center position C can be adjusted by moving one or both of the first guide portion 11 and the second guide portion 12 in this manner, the center position C can be finely adjusted without moving the entire stacker crane 81 in the rack lateral width direction X when it is necessary to finely adjust the center position C in order to perform alignment with an article W to be transferred or the transfer target location (e.g., the storage rack 80). Furthermore, the distance between the center position C of one of the pair of article transfer devices 1 included in the stacker crane 81 and the center position C of the other article transfer device 1 in the rack lateral width direction X can be adjusted, which also provides an advantage in that simultaneous transfer of articles W by the pair of article transfer devices 1 can be easily performed.

The article transfer device 1 further includes an interlocking mechanism 5 for interlocking the movement of the first guide portion 11 and the second guide portion 12 in the first direction H1 with the movement of the article supporting portion 30 such that the article supporting portion 30 is located midway between the first guide portion 11 and the second guide portion 12 in the first direction H1. Even when the center position C between the first guide portion 11 and the second guide portion 12 in the first direction H1 is moved relative to the base 2, the provision of such an interlocking mechanism 5 makes it possible to move the article supporting portion 30 in the first direction H1 so as to follow the movement of the center position C, thus the central part, in the first direction H1, of an article W is supported by the article supporting portion 30. The details of the guide movement mechanism 4 and the interlocking mechanism 5 will be described later.

As shown in FIGS. 3 and 6, each of the first guide portion 11 and the second guide portion 12 includes a distal-end member 13, a relay member 14 that slidably supports the distal-end member 13 along the second direction H2, and a basal member 15 that slidably supports the relay member 14 along the second direction H2. When a side on which the article supporting portion 30 is located in the first direction H1 is taken as the inner side, the basal member 15, the relay member 14, and the distal-end member 13 are disposed so as to be arranged in the first direction H1 in each of the first guide portion 11 and the second guide portion 12 such that the relay member 14 is located inward of the basal member 15 in the first direction H1, and the distal-end member 13 is located inward of the relay member 14 in the first direction H1. Although the details are omitted, each of the first guide portion 11 and the second guide portion 12 includes an interlocking member that interlocks the relay member 14 with the distal-end member 13. Due to the action of the interlocking member, the distal-end member 13 moves to one side in the second direction H2 relative to the relay member 14 when the relay member 14 moves to the one side in the second direction H2 relative to the basal member 15, and the distal-end member 13 moves to the other side in the second direction H2 relative to the relay member 14 when the relay member 14 moves to the other side in the second direction H2 relative to the basal member 15.

The article transfer device 1 is provided with an extension/retraction motor M3 that moves the distal-end member 13 so as to be extended and retracted relative to the basal member 15 along the second direction H2, and the control device 81f moves the distal-end member 13 so as to be extended and retracted along the second direction H2 by controlling the driving of the extension/retraction motor M3. A pair of extension/retraction motors M3 are provided corresponding to the distal-end member 13 of the first guide portion 11 and the distal-end member 13 of the second guide portion 12. Although the details are omitted, each extension/retraction motor M3 is configured to move the relay member 14 relative to the basal member 15 in the second direction H2 by rotationally driving a toothed belt that engages with a rack formed below the relay member 14 along the longitudinal direction. As a result of the relay member 14 being moved relative to the basal member 15 to either side in the second direction H2, the distal-end member 13 is extended and retracted in the second direction H2 by an action of the interlocking member described above.

The distal-end member 13 is provided with a hook 16 (an example of an abutment member) that is pivotable about a shaft that is parallel to the second direction H2, and a hook motor M4 (see FIG. 9) that changes the orientation of the hook 16. As shown in FIG. 3, the distal-end member 13 is provided with three hooks 16, namely, a hook 16 provided at one end portion of the distal-end member 13 in the second direction H2, a hook 16 provided at the other end portion of the distal-end member 13 in the second direction H2, and a hook 16 provided at the central portion of the distal-end member 13 in the second direction H2. The control device 81f controls the driving of the hook motor M4 so as to change the orientation of the hooks 16 between a retraction orientation (see FIGS. 7 and 8) in which each hook 16 is entirely disposed on the outer side of the inner face of the distal-end member 13 in the first direction H1 (the side opposite to the side on which the article supporting portion 30 is located), and an abutment orientation (see FIGS. 3 and 6) in which the distal end portion of each hook 16 is disposed inward of the inner face of the distal-end member 13 in the first direction H1. Note that the inner face of the distal-end member 13 is the inner face of a part of the distal-end member 13 that constitutes the above-described guide part. The distal-end member 13 of each of the first guide portion 11 and the second guide portion 12 is provided with three hook motors M4 corresponding to the three hooks 16, and the control device 81f can independently change the orientations of the three hooks 16.

When an article W located at a transfer target location such as the storage rack 80 is transferred to the article transfer device 1, the control device 81f controls the traveling operation of the traveling truck 81a and the lifting/lowering operation of the elevating body 81c so as to move the article transfer device 1 to a position corresponding to the transfer target location, controls the position, in the first direction H1, of each of the first guide portion 11 and the second guide portion 12 to make the distance between the first guide portion 11 and the second guide portion 12 conform to the width, in the first direction H1 (rack lateral width direction X), of the article W to be transferred, and adjusts the center position C between the first guide portion 11 and the second guide portion 12 in the first direction H1 to a position at which the article W to be transferred is disposed between the first guide portion 11 and the second guide portion 12 in the first direction H1 (for example, adjusts the center position C in alignment with the center position, in the first direction H1, of the article W to be transferred). Note that the distance between the first guide portion 11 and the second guide portion 12 (the distance between the inner face of the distal-end member 13 of the first guide portion 11 and the inner face of the distal-end member 13 of the second guide portion 12) is adjusted to a distance that is wider than the width, in the first direction H1, of the article W to be transferred, and with which the hooks 16 abut against the article W to be transferred when the hooks 16 are switched to the abutment orientation.

Then, in a state in which the orientation of the hooks 16 is changed to the retraction orientation, the control device 81f moves the distal-end member 13 of each of the first guide portion 11 and the second guide portion 12 so as to protrude to a position at which the article W to be transferred is disposed between the pair of hooks 16 arranged in the second direction H2. When two articles W arranged in the second direction H2 (the rack front-rear direction Y) are simultaneously transferred to the article transfer device 1, the control device 81f moves the distal-end member 13 of each of the first guide portion 11 and the second guide portion 12 so as to protrude to a position at which each of the two articles W to be transferred is disposed between a pair of hooks 16 arranged in the second direction H2 (see FIG. 1). Then, the control device 81f changes the orientation of the hooks 16 from the retraction orientation to the abutment orientation, and thereafter moves the distal-end member 13 of each of the first guide portion 11 and the second guide portion 12 so as to be retracted to a position at which the articles W to be transferred are supported by the article supporting portion 30 (for example, a retracted position described below). In the course of moving the distal-end member 13 of each of the first guide portion 11 and the second guide portion 12 so as to be retracted, the hooks 16 in the abutment orientation abut against the articles W, and subsequently, the retraction movement of the distal-end members 13 causes the articles W to be pulled toward the article supporting portion 30 by the hooks 16. Note that control to narrow the distance between the first guide portion 11 and the second guide portion 12 may be performed before or after, or in the course of moving the distal-end member 13 of each of the first guide portion 11 and the second guide portion 12 so as to be retracted.

When an article W located on the article transfer device 1 is transferred to a transfer target location such as the storage rack 80, the control device 81f controls the traveling operation of the traveling truck 81a and the lifting/lowering operation of the elevating body 81c so as to move the article transfer device 1 to a position corresponding to the transfer target location, and, as needed, controls the position, in the first direction H1, of each of the first guide portion 11 and the second guide portion 12 so as to adjust the center position C between the first guide portion 11 and the second guide portion 12 in the first direction H1 in accordance with the transfer target location. Then, in a state in which the orientation of the hooks 16 is changed to the abutment orientation, the control device 81f moves the distal-end member 13 of each of the first guide portion 11 and the second guide portion 12 so as to protrude to a position at which the article W to be transferred is supported at the transfer target location (for example, the support member 80a of the storage rack 80). When two articles W arranged in the second direction H2 (the rack front-rear direction Y) are transferred from the article transfer device 1, the control device 81f moves the distal-end member 13 of each of the first guide portion 11 and the second guide portion 12 so as to protrude to a position at which each of the two articles W to be transferred are supported at the transfer target location (see FIG. 1). In the course of moving the distal-end member 13 of each of the first guide portion 11 and the second guide portion 12 so as to protrude, the hooks 16 in the abutment orientation abut against the articles W, and subsequently, the protrusion movement of the distal-end members 13 causes the articles W to be pushed toward the transfer target location using the hooks 16. Then, the control device 81f changes the orientation of the hooks 16 from the abutment orientation to the retraction orientation, and thereafter, moves the distal-end member 13 of each of the first guide portion 11 and the second guide portion 12 so as to be retracted to a retracted position set on the base 2 side (for example, a position at which the center position of the distal-end member 13 in the second direction H2 coincides with the center position of the article supporting portion 30 in the second direction H2). Note that control to widen the distance between the first guide portion 11 and the second guide portion 12 may be performed before moving the distal-end member 13 of each of the first guide portion 11 and the second guide portion 12 so as to be retracted.

In the present embodiment, as shown in FIG. 3, the article supporting portion 30 includes a conveyor device 31 (here, a belt conveyor) that transports an article W along the second direction H2 while supporting the article W from below. That is, the article supporting portion 30 has the function of moving an article W along the second direction H2, in addition to the function of supporting the article W from below. The article transfer device 1 is provided with a conveyor motor M8 (see FIG. 9) that drives the conveyor device 31, and the control device 81f controls the driving of the conveyor motor M8 so as to move the article W supported by the article supporting portion 30 along the second direction H2. Specifically, when an article W located at a transfer target location such as the storage rack 80 is transferred to the article transfer device 1, the control device 81f drives, in accordance with the operation of pulling the article W toward the article supporting portion 30 using the retraction movement of the distal-end member 13, the conveyor device 31 such that the direction in which the article W is transported by the conveyor device 31 and the transport speed conform to the direction of transport of the article W using the pulling operation and the transport speed. When an article W located on the article transfer device 1 is transferred to a transfer target location such as the storage rack 80, the control device 81f drives, in accordance with the operation of pushing the article W toward the transfer target location using the protrusion movement of the distal-end member 13, the conveyor device 31 such that the direction in which the article W is transported by the conveyor device 31 and the transport speed conform to the direction of transport of the article W using the pushing operation and the transport speed. Note that a pair of conveyor devices 31 are provided so as to be arranged in the second direction H2. Also, a pair of conveyor motors M8 are provided so as to correspond to the pair of conveyor devices 31, and the control device 81f can independently drive the pair of conveyor devices 31. Note that the number of conveyor devices 31 included in the article supporting portion 30 can be changed as appropriate.

Thus, in the present embodiment, a mechanism for moving the first guide portion 11 (the distal-end member 13) so as to be extended and retracted along the second direction H2 by the extension/retraction motor M3, a mechanism for moving the second guide portion 12 (the distal-end member 13) so as to be extended and retracted along the second direction H2 by the extension/retraction motor M3, and a mechanism for driving the conveyor device 31 included in the article supporting portion 30 by the conveyor motor M8 constitute an article movement mechanism 3 for moving an article W relative to the base 2 along the second direction H2.

As described previously, the article transfer device 1 includes the interlocking mechanism 5 for interlocking the movement of the first guide portion 11 and the second guide portion 12 along the first direction H1 with the movement of the article supporting portion 30 such that the article supporting portion 30 is located midway between the first guide portion 11 and the second guide portion 12 in the first direction H1. In the following, the configuration of the interlocking mechanism 5 will be described.

Figure 4:
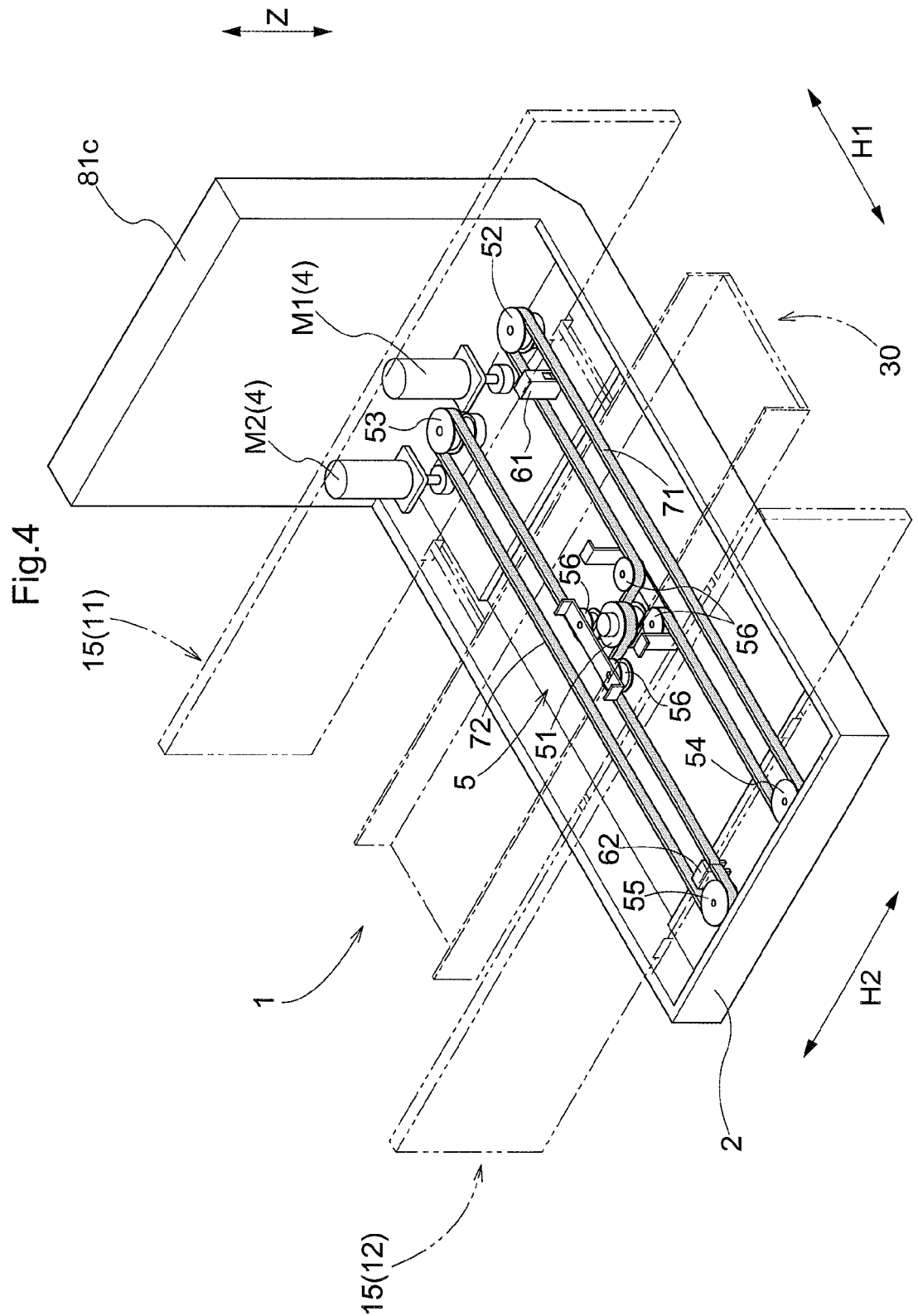
FIG. 4 is a partially phantom perspective view of the article transfer device.

As shown in FIGS. 4 and 5, the interlocking mechanism 5 includes a first rotational body 51 that is rotatably supported by the article supporting portion 30, a second rotational body 52 and a third rotational body 53 that are each fixed to the base 2 on one side in the first direction H1 relative to the first rotational body 51, and a fourth rotational body 54 and a fifth rotational body 55 that are each fixed to the base 2 on the other side in the first direction H1 relative to the first rotational body 51. As shown in FIG. 6, the first rotational body 51 is rotatably attached below the article supporting portion 30 so as to be oriented such that its shaft is parallel to the vertical direction Z, and the shaft of the first rotational body 51 moves integrally with the article supporting portion 30 along the first direction H1. Each of the second rotational body 52, the third rotational body 53, the fourth rotational body 54, and the fifth rotational body 55 is rotatably attached to the base 2 so as to be oriented such that its shaft is parallel to the vertical direction Z. As shown in FIG. 5, the second rotational body 52 and the fourth rotational body 54 are disposed at the same position in the second direction H2 on one side in the second direction H2 relative to the first rotational body 51, and the third rotational body 53 and the fifth rotational body 55 are disposed at the same position in the second direction H2 on the other side in the second direction H2 relative to the first rotational body 51.

Also, the interlocking mechanism 5 includes a first power transmission body 71 that is wound around at least the first rotational body 51, the second rotational body 52, and the fourth rotational body 54, and a second power transmission body 72 that is wound around at least the first rotational body 51, the third rotational body 53, and the fifth rotational body 55. That is, both of the first power transmission body 71 and the second power transmission body 72 are wound around the first rotational body 51.

As shown in FIGS. 4 and 5, the interlocking mechanism 5 includes four guiding rotational bodies 56 that are rotatably supported below the article supporting portion 30. Also, the first power transmission body 71 is wound in a loop shape around the first rotational body 51, a guiding rotational body 56, the second rotational body 52, the fourth rotational body 54, and a guiding rotational body 56 in this order such that the first rotational body 51, the second rotational body 52, and the fourth rotational body 54 are disposed inside the loop formed by the first power transmission body 71, and two guiding rotational bodies 56 are disposed outside the loop formed by the first power transmission body 71. The second power transmission body 72 is wound in a loop shape around the first rotational body 51, a guiding rotational body 56, the third rotational body 53, the fifth rotational body 55, and a guiding rotational body 56 in this order such that the first rotational body 51, the third rotational body 53, and the fifth rotational body 55 are disposed inside the loop formed by the second power transmission body 72, and two guiding rotational bodies 56 are disposed outside the loop formed by the second power transmission body 72. The guiding rotational body 56 is provided in order to ensure a large length for the portion where the first power transmission body 71 and the second power transmission body 72 come into contact with the first rotational body 51 (the length along the outer circumference). As shown in FIG. 6, the first power transmission body 71 and the second power transmission body 72 are disposed at mutually different positions in the vertical direction Z. Accordingly, the first power transmission body 71 and the second power transmission body 72 can be disposed so as to intersect each other in plan view (see FIGS. 4 and 5), while being prevented from interfering with each other.

Note that the power transmission bodies (71, 72) are members that are each formed to be cable-like and transmit power between a plurality of rotational bodies (51 to 56). As the power transmission bodies (71, 72), it is possible to use, for example, a belt, a toothed belt, a chain, a wire, or the like. As the rotational bodies (51 to 56), it is possible to use, for example, a pulley, a sprocket, or the like.

Since the interlocking mechanism 5 is configured in this manner, when only the first power transmission body 71 out of the first power transmission body 71 and the second power transmission body 72 is rotationally driven along its longitudinal direction, the first rotational body 51 moves along the first direction H1 while rotating. Then, as is evident from FIG. 5, the movement distance of the shaft of the first rotational body 51 in the first direction H1 in this case is shorter than the movement distance of each portion of the first power transmission body 71 by a product of the outer circumferential length of the first rotational body 51 and the rotation amount of the first rotational body 51. Specifically, it is half the distance of the movement distance of each portion of the first power transmission body 71. That is, the movement speed of the shaft of the first rotational body 51 along the first direction H1 is half the movement speed of each portion of the first power transmission body 71. Similarly, when only the second power transmission body 72 out of the first power transmission body 71 and the second power transmission body 72 is rotationally driven along its longitudinal direction, the movement distance of the shaft of the first rotational body 51 along the first direction H1 is half the movement distance of each portion of the second power transmission body 72. That is, the movement speed of the shaft of the first rotational body 51 along the first direction H1 is half the movement speed of each portion of the second power transmission body 72.

In view of such an operation of the interlocking mechanism 5, the interlocking mechanism 5 includes a first movement portion 61 fixed to the first power transmission body 71 and a second movement portion 62 fixed to the second power transmission body 72, as shown in FIGS. 4 and 5. Also, as shown in FIG. 6, the first movement portion 61 is connected to a lower portion of the first guide portion 11 (below the basal member 15 included in the first guide portion 11) so as to move integrally with the first guide portion 11 along the first direction H1, and the second movement portion 62 is connected to a lower portion of the second guide portion 12 (below the basal member 15 included in the second guide portion 12) so as to move integrally with the second guide portion 12 along the first direction H1.

As shown in FIG. 5, the first movement portion 61 and the second movement portion 62 are disposed on sides opposite each other in the first direction H1 relative to the first rotational body 51. The shaft of the first rotational body 51 is disposed at the center position between the first movement portion 61 and the second movement portion 62 in the first direction H1. Also, the first movement portion 61 and the second movement portion 62 are connected to the first rotational body 51 so as to move to sides opposite to each other along the first direction H1 according to the rotation of the first rotational body 51. Specifically, the first movement portion 61 is connected to the first rotational body 51 so as to move along the first direction H1 to a side approaching the second rotational body 52 from the fourth rotational body 54 when the first rotational body 51 is rotated clockwise in FIG. 5. The second movement portion 62 is connected to the first rotational body 51 so as to move along the first direction H1 to a side approaching the fifth rotational body 55 from the third rotational body 53 when the first rotational body 51 is rotated clockwise in FIG. 5. That is, the first movement portion 61 is connected to a portion of the first power transmission body 71 that moves to the same side in the first direction H1 as the shaft of the first rotational body 51 (here, a portion connecting the second rotational body 52 and the guiding rotational body 56) when only the first power transmission body 71 out of the first power transmission body 71 and the second power transmission body 72 is rotationally driven along its longitudinal direction. The second movement portion 62 is connected to a portion of the second power transmission body 72 that moves to the same side in the first direction H1 as the shaft of the first rotational body 51 (here, a portion connecting the fifth rotational body 55 and the guiding rotational body 56) when only the second power transmission body 72 out of the first power transmission body 71 and the second power transmission body 72 is rotationally driven along its longitudinal direction.

Accordingly, when one of the first guide portion 11 and the second guide portion 12 is moved along the first direction H1, the first rotational body 51 moves, while rotating, to the same side as the side to which that guide portion moves in the first direction H1, regardless of which one of the guide portions is moved. Then, the movement distance of the shaft of the first rotational body 51 along the first direction H1 in this case is half the movement distance of the first guide portion 11 or the second guide portion 12 along the first direction H1. Accordingly, when either one of the first guide portion 11 and the second guide portion 12 is moved, the shaft of the first rotational body 51 moves along the first direction H1 so as to follow the movement of the center position between the first guide portion 11 and the second guide portion 12 in the first direction H1. That is, the article supporting portion 30 can be moved along the first direction H1 so as to follow the movement of the center position between the first guide portion 11 and the second guide portion 12 in the first direction H1.

Figure 7:
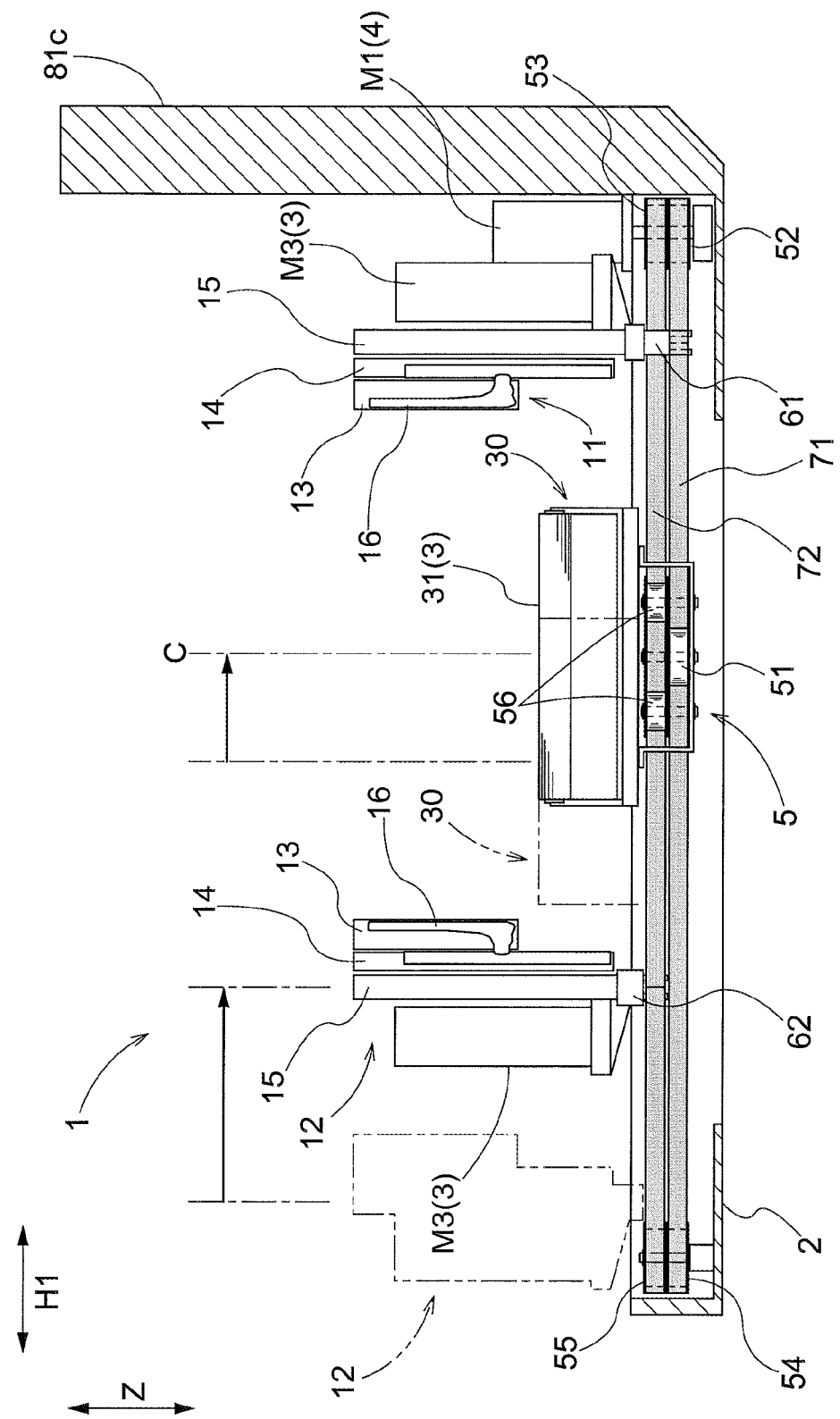
FIG. 7 is a front view of the article transfer device.

For example, when only the second guide portion 12 is moved from the state shown in FIG. 6 to a side so that the distance between the first guide portion 11 and the second guide portion 12 in the first direction H1 is narrowed, the article supporting portion 30 moves along the first direction H1 to the same side to which the second guide portion 12 is moved in the first direction H1 by half the movement distance of the second guide portion 12 along the first direction H1, as shown in FIG. 7. As a result, the article supporting portion 30 (see FIG. 6) located at the center between the first guide portion 11 and the second guide portion 12 in the first direction H1 before the second guide portion 12 was moved is located at the center between the first guide portion 11 and the second guide portion 12 in the first direction H1 during and after the movement of the second guide portion 12 (see FIG. 7).

Figure 8:
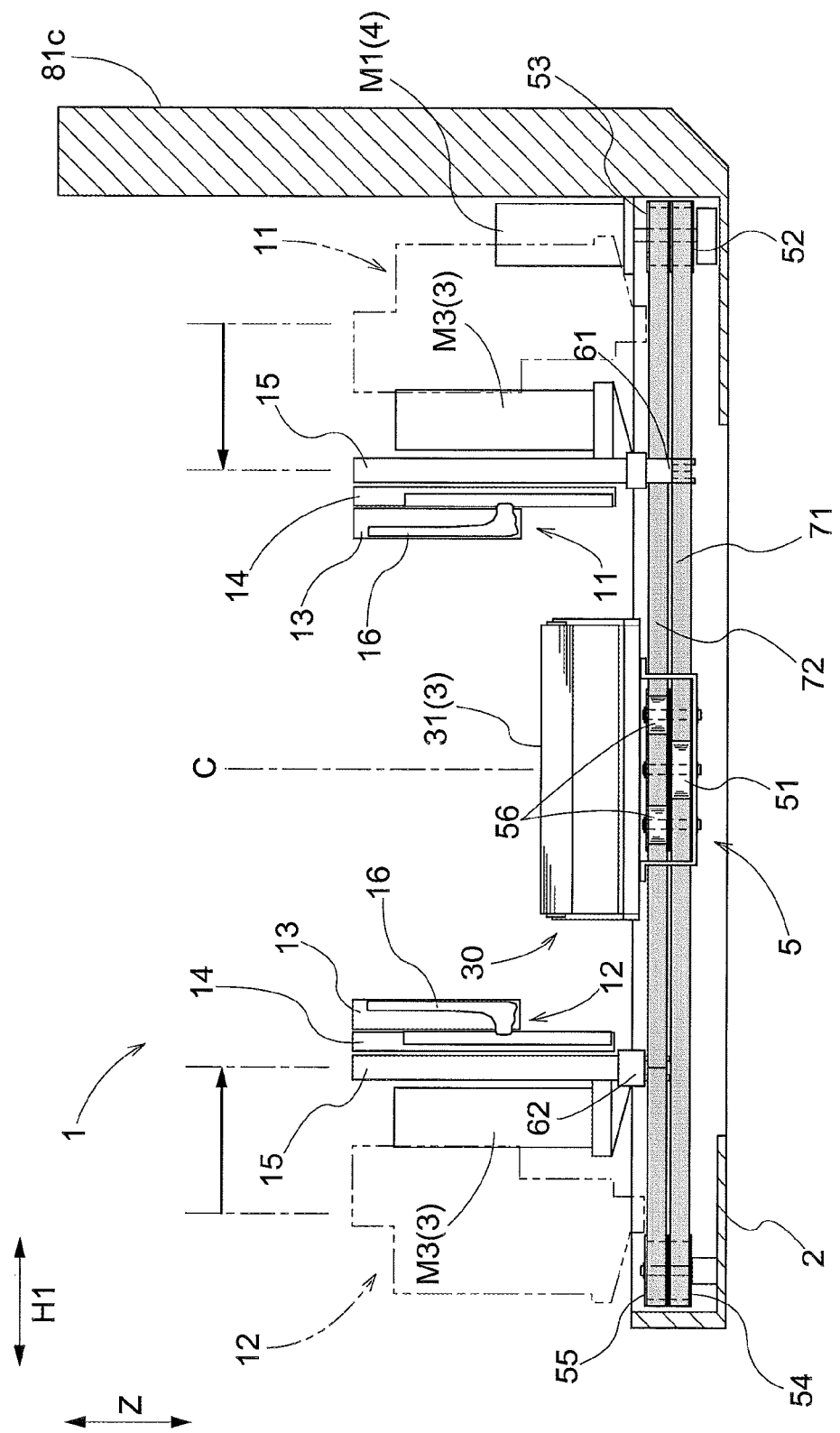
FIG. 8 is a front view of the article transfer device

The final position of the article supporting portion 30 in the first direction H1 when both the first guide portion 11 and the second guide portion 12 are moved along the first direction H1 is the same position as that when only one of the first guide portion 11 and the second guide portion 12 is first moved to a target position before the other of the first guide portion 11 and the second guide portion 12 is moved to a target position. Accordingly, the article supporting portion 30 can be moved along the first direction H1 so as to follow the movement of the center position between the first guide portion 11 and the second guide portion 12 in the first direction H1, not only when only one of the first guide portion 11 and the second guide portion 12 is moved along the first direction H1, but also when both the first guide portion 11 and the second guide portion 12 are moved along the first direction H1. FIG. 8 shows a case where both the first guide portion 11 and the second guide portion 12 are moved, by the same distance, from the state shown in FIG. 6 to sides so that the distance between the first guide portion 11 and the second guide portion 12 is narrowed in the first direction H1. In this case, the center position between the first guide portion 11 and the second guide portion 12 in the first direction H1 does not move, and each of the first guide portion 11 and the second guide portion 12 moves to a side to which they approach each other in a state in which the article supporting portion 30 is kept at the center position.

Thus, as a result of the operation of the interlocking mechanism 5, the article supporting portion 30 is located midway between the first guide portion 11 and the second guide portion 12 in the first direction H1, regardless of the position of each of the first guide portion 11 and the second guide portion 12 in the first direction H1. As shown in FIG. 6, the first rotational body 51 is supported by the article supporting portion 30 such that its shaft is disposed at the center position of the article supporting portion 30 in the first direction H1. Accordingly, the article supporting portion 30 is disposed at the center position between the first guide portion 11 and the second guide portion 12 in the first direction H1, regardless of the position of each of the first guide portion 11 and the second guide portion 12 in the first direction H1.

As shown in FIGS. 4 and 5, the article transfer device 1 is provided with a first guide moving motor M1 that moves the first guide portion 11 along the first direction H1, and a second guide moving motor M2 that moves the second guide portion 12 along the first direction H1. That is, the guide movement mechanism 4 for moving the first guide portion 11 and the second guide portion 12 independently along the first direction H1 includes the first guide moving motor M1 and the second guide moving motor M2. The first guide moving motor M1 and the second guide moving motor M2 are fixed to the base 2. Then, the control device 81f moves the first guide portion 11 along the first direction H1 by controlling the driving of the first guide moving motor M1, and moves the second guide portion 12 along the first direction H1 by controlling the driving of the second guide moving motor M2. In the present embodiment, the first guide moving motor M1 corresponds to a "first driving power source", and the second guide moving motor M2 corresponds to a "second driving power source".

As shown in FIGS. 4 and 5, the first guide moving motor M1 is provided so as to rotationally drive the second rotational body 52, and the second guide moving motor M2 is provided so as to rotationally drive the third rotational body 53. That is, of a plurality of rotational bodies around which the first power transmission body 71 is wound, the second rotational body 52 is a driving rotational body that rotationally drives the first power transmission body 71, the first rotational body 51 is a following rotational body whose shaft is movable along the first direction H1 relative to the base 2, and the remaining rotational bodies are following rotational bodies whose shafts are fixed to the base 2. Then, as a result of the first power transmission body 71 being rotationally driven by the driving power of the first guide moving motor M1, the first guide portion 11 moves along the first direction H1. Of a plurality of rotational bodies around which the second power transmission body 72 is wound, the third rotational body 53 is a driving rotational body that rotationally drives the second power transmission body 72, the first rotational body 51 is a following rotational body whose shaft is movable along the first direction H1 relative to the base 2, and the remaining rotational bodies are following rotational bodies whose shafts are fixed to the base 2. Then, as a result of the second power transmission body 72 being rotationally driven by the driving power of the second guide moving motor M2, the second guide portion 12 moves along the first direction H1. Note that it is possible to adopt a configuration in which the first guide moving motor M1 rotationally drives the fourth rotational body 54, or a configuration in which the second guide moving motor M2 rotationally drives the fifth rotational body 55.

Thus, in the article transfer device 1, the second rotational body 52, the fourth rotational body 54, and the first power transmission body 71 that constitute the interlocking mechanism 5 are used for the mechanism for moving the first guide portion 11 along the first direction H1, and the third rotational body 53, the fifth rotational body 55, and the second power transmission body 72 that constitute the interlocking mechanism 5 are used for the mechanism for moving the second guide portion 12 along the first direction H1. That is, the rotational bodies (52 to 55) and the power transmission bodies (71,72) that constitute the interlocking mechanism 5 are also used for the guide movement mechanism 4, and the configuration of the article transfer device 1 can be simplified accordingly.

OTHER EMBODIMENTS

Next, other embodiments of the article transfer device will be described.

(1) The above embodiment described, as an example, a configuration in which the first power transmission body 71 is wound such that the first rotational body 51 is disposed inside the loop formed by the first power transmission body 71, and the second power transmission body 72 is wound such that the first rotational body 51 is disposed inside the loop formed by the second power transmission body 72. However, the present invention is not limited to such a configuration, and it is possible to adopt a configuration in which the first power transmission body 71 is wound such that the first rotational body 51 is disposed outside the loop formed by the first power transmission body 71, and the second power transmission body 72 is wound such that the first rotational body 51 is disposed outside the loop formed by the second power transmission body 72. Although the above embodiment described, as an example, a configuration in which the interlocking mechanism 5 includes the guiding rotational bodies 56, it is possible to adopt a configuration in which the interlocking mechanism 5 does not include the guiding rotational bodies 56.

(2) The above embodiment described, as an example, a configuration in which the interlocking mechanism 5 includes the first power transmission body 71 that is wound around at least the first rotational body 51, the second rotational body 52, and the fourth rotational body 54 as a member for connecting the first rotational body 51 to the first movement portion 61, and the second power transmission body 72 that is wound around at least the first rotational body 51, the third rotational body 53, and the fifth rotational body 55 as a member for connecting the first rotational body 51 to the second movement portion 62. However, the present invention is not limited to such a configuration, and the interlocking mechanism 5 may be configured as a mechanism using a rack-and-pinion mechanism, or may be configured as a mechanism using a link mechanism.

Figure 10:
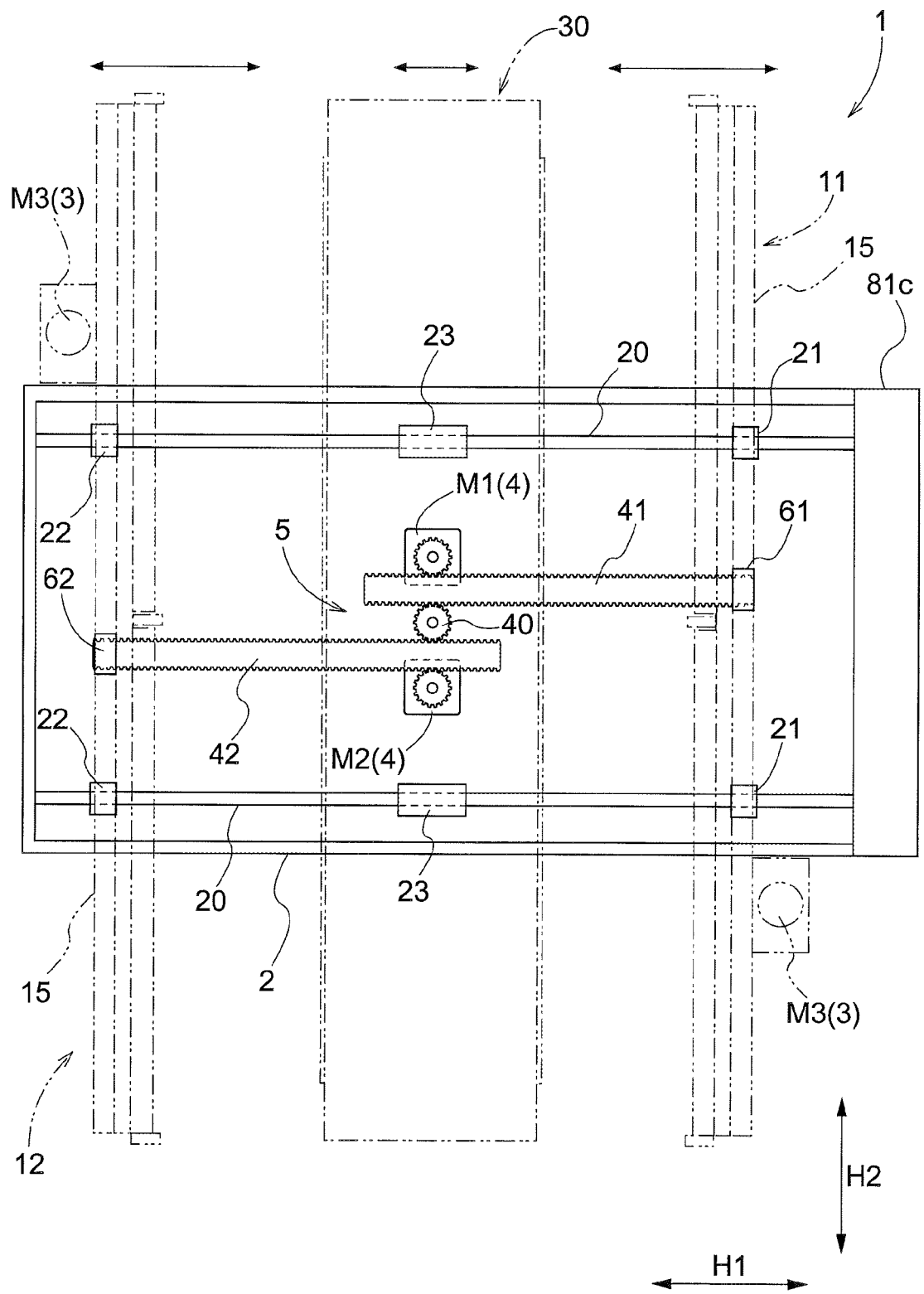
FIG. 10 is a partially phantom plan view of an article transfer device according to another embodiment.

FIG. 10 shows an example of a case where the interlocking mechanism 5 is configured as a mechanism using a rack-and-pinion mechanism. In the example shown in FIG. 10, the interlocking mechanism 5 includes, as the first rotational body, a pinion 40 whose shaft is rotatably attached to a lower portion of the article supporting portion 30 so as to be oriented parallel to the vertical direction Z, and also includes a first rack 41 that connects the pinion 40 to the first movement portion 61, and a second rack 42 that connects the pinion 40 to the second movement portion 62. The first rack 41 is connected so as to move integrally with the first guide portion 11 along the first direction H1 as a result of being connected to the first movement portion 61 in an orientation extending along the first direction H1, and the second rack 42 is connected so as to move integrally with the second guide portion 12 along the first direction H1 as a result of being connected to the second movement portion 62 in an orientation extending along the first direction H1. The first rack 41 and the second rack 42 are disposed so as to engage with the pinion 40 from sides opposite to each other in the second direction H2. Teeth for engaging with a gear driven by the first guide moving motor M1 are formed on a portion of the first rack 41 that is located on a side opposite to the pinion 40 in the second direction H2, and teeth for engaging with a gear driven by the second guide moving motor M2 are formed on a portion of the second rack 42 that is located on a side opposite to the pinion 40 in the second direction H2. Note that the first guide moving motor M1 and the second guide moving motor M2 are fixed to the base 2.

In an interlocking mechanism 5 having such a configuration, as in the above embodiment, it is also possible to move the first guide portion 11 along the first direction H1 by controlling the driving of the first guide moving motor M1, and to move the second guide portion 12 along the first direction H1 by controlling the driving of the second guide moving motor M2. Then, when either one of the first rack 41 and the second rack 42 is moved along the first direction H1, the pinion 40 moves, while rotating, to a side to which that rack moves in the first direction H1, and the movement distance of the shaft of the pinion 40 along the first direction H1 is half the movement distance of the first rack 41 or the second rack 42 along the first direction H1. Accordingly, in an interlocking mechanism 5 having a configuration such as that shown in FIG. 10, as in the above embodiment, the article supporting portion 30 can be moved along the first direction H1 so as to follow the movement of the center position between the first guide portion 11 and the second guide portion 12 in the first direction H1.

(3) The above embodiment is described, taking, as an example, a configuration in which the rotational bodies (52 to 55) and the power transmission bodies (71, 72) constituting the interlocking mechanism 5 are also used for the guide movement mechanism 4. However, the present invention is not limited to such a configuration, and the guide movement mechanism 4 may be configured as a mechanism independent of the interlocking mechanism 5. In this case, the guide movement mechanism 4 may be configured as a mechanism using a rack-and-pinion mechanism, for example.

(4) The above embodiment described, as an example, a configuration in which each of the first guide portion 11 and the second guide portion 12 includes a three-stage slide mechanism including the distal-end member 13, the relay member 14, and the basal member 15. However, the present invention is not limited to such a configuration, and it is possible to adopt a configuration in which each of the first guide portion 11 and the second guide portion 12 includes a slide mechanism with four or more stages. The above embodiment described, as an example, a configuration in which the distal-end member 13 of each of the first guide portion 11 and the second guide portion 12 is provided with three hooks 16 arranged in the second direction H2. However, it is possible to adopt a configuration in which the distal-end member 13 of each of the first guide portion 11 and the second guide portion 12 is provided with two hooks 16 or four or more hooks 16 arranged in the second direction H2.

(5) The above embodiment is described, taking, as an example, a configuration in which the distal-end member 13 of each of the first guide portion 11 and the second guide portion 12 is provided with the hooks 16, and the article W is moved relative to the base 2 along the second direction H2 by pushing or pulling the article W with the hooks 16 in the abutment orientation. However, the present invention is not limited to such a configuration, and it is possible to adopt a configuration in which the distal-end member 13 of each of the first guide portion 11 and the second guide portion 12 is not provided with the hooks 16, and the distal-end member 13 of each of the first guide portion 11 and the second guide portion 12 is moved so as to be extended and retracted along the second direction H2 in a state in which the article W is sandwiched by the distal-end member 13 of the first guide portion 11 and the distal-end member 13 of the second guide portion 12 from both sides in the first direction H1, thereby moving the article W relative to the base 2 along the second direction H2. In this case, the first guide portion 11 and the second guide portion 12 have the function of sandwiching the article W, in addition to the function of performing guiding to restrict the position of the article W in the first direction H1. In a configuration in which the article W is sandwiched by the distal-end member 13 of the first guide portion 11 and the distal-end member 13 of the second guide portion 12 from both sides in the first direction H1 in this manner, it is possible to adopt a configuration in which the distal-end member 13 of each of the first guide portion 11 and the second guide portion 12 is provided with a conveyor device (a belt conveyor or the like) that abuts against a side portion of the article W so as to transport the article W along the second direction H2. In this case, the first guide portion 11 and the second guide portion 12 have the function of transporting the article W while sandwiching the article W, in addition to the function of performing guiding to restrict the position of the article W in the first direction H1.

(6) The above embodiment described, as an example, a configuration in which the position of the article supporting portion 30 relative to the base 2 in the second direction H2 is fixed, and the article supporting portion 30 includes the conveyor device 31. However, the present invention is not limited to such a configuration, and it is possible to adopt a configuration in which the article supporting portion 30 does not include the conveyor device 31, and the article transfer device 1 is provided with a mechanism for moving the article supporting portion 30 so as to be extended and retracted along the second direction H2, as the article movement mechanism 3 for moving the article W relative to the base 2 along the second direction H2. In this case, an article W is transferred between the article supporting portion 30 (the article transfer device 1) and the transfer target location by lifting and lowering the elevating body 81c in a state in which the article supporting portion 30 protrudes toward the transfer target location. When the article transfer device 1 is provided with a mechanism for moving the article supporting portion 30 so as to be extended and retracted along the second direction H2 in this manner, the first guide portion 11 and the second guide portion 12 may not be necessarily provided with a mechanism that operates as the article movement mechanism 3. For example, it is possible to adopt a configuration in which the first guide portion 11 and the second guide portion 12 are each formed by a member (e.g., a flat plate-like member) whose position in the second direction H2 relative to the base 2 is fixed. Further, in such a case, it is possible to adopt a configuration in which a first conveyor device and a second conveyor device (belt conveyors or the like) that transport an article W along the second direction H2 while supporting the article W from below are provided separately on both sides in the first direction H1 relative to the article supporting portion 30, and the first conveyor device is connected so as to move integrally with the first guide portion 11 along the first direction H1, and the second conveyor device is connected so as to move integrally with the second guide portion 12 along the first direction H1.

(7) The above embodiment described, as an example, a configuration in which two articles W are stored in the storage rack 80 so as to be arranged in the rack front-rear direction Y. However, the present invention is not limited to such a configuration, and it is possible to adopt a configuration in which three or more articles W are stored in the storage rack 80 so as to be arranged in the rack front-rear direction Y, or a configuration in which only one article W is stored at the same position in the rack lateral width direction X in each row (each storage position in the vertical direction Z) of the storage rack 80. The above embodiment is described, taking, as an example, a configuration in which a plurality of articles W are supported and arranged in the rack lateral width direction X on the support member 80*a* provided so as to span a pair of struts 80*b* arranged in the rack lateral width direction X. However, the present invention is not limited to such a configuration, and it is possible to adopt a configuration in which only one article W is supported on each row of the storage rack 80 at the same position in the rack front-rear direction Y between a pair of struts 80*b* arranged in the rack lateral width direction X. In this case, the support member 80*a* may be provided so as to support only both end portions of the bottom of an article W in the rack lateral width direction X. Although the above embodiment described, as an example, a configuration in which a pair of storage racks 80 are installed so as to be opposed in the rack front-rear direction Y, across the traveling path R, it is possible to adopt a configuration in which a storage rack 80 is installed only on one side in the rack front-rear direction Y relative to the traveling path R.

(8) Although the above embodiment described, as an example, a case where the article transfer device according to the present disclosure is applied to the stacker crane 81 having the configuration as shown in FIGS. 1 and 2, the configuration of the stacker crane 81 to which the article transfer device is mounted can be changed as appropriate. For example, the article transfer device according to the present disclosure can be applied to a stacker crane 81 including only one elevating body 81*c*. The article transfer device according to the present disclosure can also be applied to an article transport device other than a stacker crane. For example, the article transfer device according to the present disclosure can be applied to an article transport device that autonomously travels on a floor surface while recognizing its own current position, or an article transport device that travels along a traveling path provided in each row of the storage rack 80 along the rack lateral width direction X.

(9) Note that the configurations disclosed in the embodiments described above are applicable in combination with configurations disclosed in other embodiments (including combinations of the embodiments described as Other Embodiments) as long as no inconsistency arises. With regard to the other configurations as well, the embodiments disclosed herein are in all respects illustrative. Therefore, various modifications and alterations may be made as appropriate without departing from the gist of the present disclosure.

Outline of the Embodiment

An outline of the article transfer device described above will be described below.

The article transfer device includes: an article supporting portion that supports an article from below; a first guide portion and a second guide portion that oppose each other in a first direction extending along a horizontal plane, across the article supported by the article supporting portion; a base that supports the article supporting portion, the first guide portion, and the second guide portion; and an article movement mechanism for moving the article relative to the base along a second direction orthogonal to the first direction on the horizontal plane. The article supporting portion, the first guide portion, and the second guide portion are supported by the base so as to be movable in the first direction, and the article transfer device further includes: a guide movement mechanism for moving the first guide portion and the second guide portion independently along the first direction; and an interlocking mechanism for interlocking movement of the first guide portion and the second guide portion along the first direction with movement of the article supporting portion such that the article supporting portion is located midway between the first guide portion and the second guide portion in the first direction.

With this configuration, the article transfer device includes the guide movement mechanism for moving the first guide portion and the second guide portion independently along the first direction. Accordingly, the movement direction and the movement distance in the first direction can be set independently for each of the first guide portion and the second guide portion. Thus, by moving one or both of the first guide portion and the second guide portion along the first direction, it is possible to adjust not only the interval (the separation distance in the first direction) between the first guide portion and the second guide portion, but also the center position between the first guide portion and the second guide portion in the first direction.

Furthermore, with the above-described configuration, the article supporting portion that supports the article from below is supported by the base so as to be movable in the first direction, and the article transfer device includes the interlocking mechanism, in addition to the guide movement mechanism. Then, the interlocking mechanism is configured to interlock the movement of the first guide portion and the second guide portion along the first direction with the movement of the article supporting portion such that the article supporting portion is located midway between the first guide portion and the second guide portion in the first direction. Thus, even when the center position between the first guide portion and the second guide portion in the first direction is moved relative to the base, it is possible to move the article supporting portion in the first direction so as to follow the movement of the center position, thus supporting the central part of the article in the first direction with the article supporting portion.

As described above, with the above-described configuration, it is possible to achieve an article transfer device that can stably support the article using the article supporting portion, while achieving a configuration in which the first guide portion and the second guide portion are independently movable along the first direction.

Here, it is preferable that the interlocking mechanism includes a first rotational body rotatably supported by the article supporting portion, and a first movement portion and a second movement portion that are connected to the first rotational body so as to move to sides opposite to each other along the first direction following rotation of the first rotational body, and the first movement portion is connected so as to move integrally with the first guide portion along the first direction, and the second movement portion is connected so as to move integrally with the second guide portion along the first direction.

With this configuration, the first movement portion connected so as to move integrally with the first guide portion along the first direction and the second movement portion connected so as to move integrally with the second guide portion along the first direction are connected to the first rotational body so as to move to sides opposite to each other along the first direction following rotation of the first rotational body. Accordingly, when one of the first guide portion and the second guide portion is moved along the first direction, the first rotational body can move, while rotating, to the same side to which that guide portion is moved in the first direction, regardless of which one of the guide portions is moved. Then, the movement distance of the shaft of the first rotational body along the first direction in this case is shorter than the movement distance of the first guide portion or the second guide portion along the first direction by a distance corresponding to the number of rotations of the first rotational body. For example, the movement distance of the shaft of the first rotational body along the first direction can be half the movement distance of the first guide portion or the second guide portion along the first direction. As a result, when either one of the first guide portion and the second guide portion is moved, it is possible to move the first rotational body in the first direction so as to follow the movement of the center position between the first guide portion and the second guide portion in the first direction (i.e., to move the article supporting portion in the first direction).

Thus, with the above-described configuration, an interlocking mechanism for moving the article supporting portion in the first direction so as to follow the movement of the center position between the first guide portion and the second guide portion in the first direction can be appropriately formed by using the first rotational body.

In a configuration in which the interlocking mechanism includes the first rotational body, the first movement portion, and the second movement portion as described above, it is preferable that the interlocking mechanism includes a second rotational body and a third rotational body that are each fixed to the base on one side in the first direction relative to the first rotational body, a fourth rotational body and a fifth rotational body that are each fixed to the base on the other side in the first direction relative to the first rotational body, a first power transmission body wound around at least the first rotational body, the second rotational body, and the fourth rotational body, and a second power transmission body wound around at least the first rotational body, the third rotational body, and the fifth rotational body, and the first movement portion is fixed to the first power transmission body, and the second movement portion is fixed to the second power transmission body.

With this configuration, each of the first movement portion and the second movement portion can be connected to the first rotational body by the power transmission body. Accordingly, as compared with when the first movement portion and the second movement portion are directly connected to the first rotational body, it is possible to ensure a wider range of movement for each of the first movement portion and the second movement portion in the first direction (i.e., a wider range of movement for each of the first guide portion and the second guide portion in the first direction). With the above-described configuration, it is possible to move the first rotational body in the first direction so as to follow the movement of the center position between the first guide portion and the second guide portion in the first direction (i.e., to move the article supporting portion in the first direction), without moving each of the second rotational body, the third rotational body, the fourth rotational body, and the fifth rotational body in the second direction (a direction orthogonal to the first direction on a horizontal plane). Accordingly, it is possible to reduce the placement space of the interlocking mechanism in the second direction.

In a configuration in which the interlocking mechanism includes the first power transmission body and the second power transmission body as described above, it is preferable that the guide movement mechanism includes a first driving power source that rotationally drives one of the second rotational body and the fourth rotational body, and a second driving power source that rotationally drives one of the third rotational body and the fifth rotational body.

With this configuration, the first guide portion can be moved along the first direction by rotationally driving one of the second rotational body and the fourth rotational body by using the first driving power source, and the second guide portion can be moved along the first direction by rotationally driving one of the third rotational body and the fifth rotational body by using the second driving power source. Also, with this configuration, the rotational body and the power transmission body constituting the interlocking mechanism can also be used for the guide movement mechanism, thus making it possible to simplify the configuration of the article transfer device accordingly.

It is sufficient that the article transfer device according to the present disclosure can achieve at least one of the above-described effects.

What is claimed is:

1. An article transfer device comprising:
an article supporting portion that supports an article from below;
a first guide portion and a second guide portion that oppose each other in a first direction extending along a horizontal plane, across the article supported by the article supporting portion;
a base that supports the article supporting portion, the first guide portion, and the second guide portion; and
an article movement mechanism for moving the article relative to the base along a second direction orthogonal to the first direction on the horizontal plane, wherein:
the article supporting portion, the first guide portion, and the second guide portion are supported by the base so as to be movable in the first direction,
the article supporting portion is movable along the first direction relative to both the first guide portion and the second guide portion, and
the article transfer device further comprises:
a guide movement mechanism for moving the first guide portion and the second guide portion independently along the first direction; and
an interlocking mechanism for interlocking movement of the first guide portion and the second guide portion along the first direction relative to the base with movement of the article supporting portion along the first direction relative to the base such that the article supporting portion is located midway between the first guide portion and the second guide portion in the first direction.

2. An article transfer device comprising:
an article supporting portion that supports an article from below;
a first guide portion and a second guide portion that oppose each other in a first direction extending along a horizontal plane, across the article supported by the article supporting portion;
a base that supports the article supporting portion, the first guide portion, and the second guide portion; and
an article movement mechanism for moving the article relative to the base along a second direction orthogonal to the first direction on the horizontal plane, wherein:
the article supporting portion, the first guide portion, and the second guide portion are supported by the base so as to be movable in the first direction, and the article transfer device further comprises:
- a guide movement mechanism for moving the first guide portion and the second guide portion independently along the first direction; and
- an interlocking mechanism for interlocking movement of the first guide portion and the second guide portion along the first direction with movement of the article supporting portion such that the article supporting portion is located midway between the first guide portion and the second guide portion in the first direction,
- the interlocking mechanism includes a first rotational body rotatably supported by the article supporting portion, and a first movement portion and a second movement portion that are connected to the first rotational body so as to move to sides opposite to each other along the first direction following rotation of the first rotational body, and
- the first movement portion is connected so as to move integrally with the first guide portion along the first direction, and the second movement portion is connected so as to move integrally with the second guide portion along the first direction.

3. The article transfer device according to claim 2, wherein:
- the interlocking mechanism includes a second rotational body and a third rotational body that are each fixed to the base on one side in the first direction relative to the first rotational body, a fourth rotational body and a fifth rotational body that are each fixed to the base on the other side in the first direction relative to the first rotational body, a first power transmission body wound around at least the first rotational body, the second rotational body, and the fourth rotational body, and a second power transmission body wound around at least the first rotational body, the third rotational body, and the fifth rotational body, and
- the first movement portion is fixed to the first power transmission body, and the second movement portion is fixed to the second power transmission body.

4. The article transfer device according to claim 3, wherein the guide movement mechanism includes a first driving power source that rotationally drives one of the second rotational body and the fourth rotational body, and a second driving power source that rotationally drives one of the third rotational body and the fifth rotational body.

* * * * *